3,781,257
COPOLYMERIZATION OF CYCLOPENTENE WITH POLYCYCLIC POLYOLEFINES
Gottfried Pampus and Nikolaus Schon, Leverkusen, Josef Witte, Cologne, and Gunter Marwede, Leverkusen, Germany, assignors to Bayer Aktiengesellschaft, Leverkusen, Germany
No Drawing. Continuation-in-part of abandoned application Ser. No. 93,472, Nov. 27, 1970. This application Dec. 2, 1971, Ser. No. 204,372
Claims priority, application Germany, Dec. 10, 1969, P 19 61 865.6
Int. Cl. C08f 15/04
U.S. Cl. 260—88.2 D          7 Claims

ABSTRACT OF THE DISCLOSURE

A process for the preparation of copolymers from cyclic monoolefins and cyclic polyolefins by polymerization in an inert organic solvent in the presence of an organo-metallic mixed catalyst, characterized in that the catalyst used is an organo-metallic mixed catalyst of (a) a reaction product of a tungsten halogen compound with an epoxide or a halogen substituted and (b) an organic aluminum compound.

---

CROSS REFERENCE TO RELATED APPLICATION

This application is a continuation-in-part of application Ser. No. 93,472, filed Nov. 27, 1970, and now abandoned.

It is known to polymerize cyclopentene and other cycloolefines in a process involving ring opening, using, as catalysts, systems of tungsten halides such as $WCl_6$, cocatalysts and organo-metallic compounds. In such processes, the tungsten component must generally first be reacted with the monomer solution or the monomer.

Attempts have also been made to prepare copolymers of cycloolefines (such as cyclopentene) and monocyclic or polycyclic diolefines or polyolefines by means of the above mentioned tungsten catalyst/cocatalyst system. The polymerization yields, however, are considerably reduced when cyclic polyolefines are added to the cyclopentene. This may be due to side reactions of the tungsten halides with the cyclic polyolefines during catalyst preparation since tungsten halides have a high Friedel-Crafts activity and rapidly produce insoluble reaction products with cyclic polyolefines dissolved in aromatic hydrocarbons.

The invention relates to a process for the preparation of copolymers by copolymerizing cyclic monoolefines and cyclic polyolefines in an inert organic solvent in the presence of an organo-metallic mixed catalyst of (a) a reaction product of a tungsten halide compound with an epoxide or an aliphatic halogenated alcohol, and
(b) an organic aluminum compound.

Suitable cyclic monoolefines are those which polymerize with ring opening in the presence of tungsten catalysts, e.g. cyclomonoolefines containing 4–18 carbon atoms, such as cyclopentene, cyclooctene, cyclodecene, cyclooctadecene. Cyclopentene is preferred. Cyclic polyolefines in accordance with the present invention are monocyclic hydrocarbons (e.g. having 5 to 18 carbon atoms) which contain two, three or more C=C-double bonds or bi-, tri- or polycyclic hydrocarbons (e.g. having a total of 7 to 18 carbon atoms) with a total of two, three or more C=C-double bonds which are all in one ring or distributed over several rings. Examples of such compounds are norbornadiene, dicyclopentadiene, Tricyclopentadiene, cyclopentadiene, cycloocta - 1,5 - diene, cyclododeca-1,5,9-triene. The polyolefines may be used in quantities of 0.01–50%, based on the cyclic monoolefine, and are preferably used in quantities of 0.1–10%.

CATALYSTS

The catalyst starting materials (a) may be prepared by reacting tungsten halide compounds with epoxides or halogenated alcohols in a solvent. Suitable halogenated tungsten compounds are, in particular, tungsten halides (preferably fluoride, chloride, and bromide) and tungsten oxyhalides (preferably fluoride, chloride, and bromide) such as $WCl_5$, $WCl_6$, $WBr_5$, $WBr_6$, $WCl_4O$ and $WF_6$. Suitable solvents are hydrocarbons and halo-hydrocarbons (preferably having boiling points of from 50 to 300° C.) such as hexane, pentane, isooctane, benzene, toluene, xylene, cyclohexane, chlorobenzene, tetrachloroethylene, carbon tetrachloride, methylene chloride. It is preferred to select the solvent which is also used in the polymerization.

The epoxides used are preferably those of the general formula

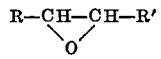

in which R and R' which may be the same or different, represent hydrogen, alkyl (preferably containing 1–6 carbon atoms), alkoxy (preferably containing 1–6 carbon atoms) alkenyl (preferably containing 2–6 carbon atoms), halogenated (chlorinated, brominated) alkyl, preferably containing 1–6 carbon atoms, or alkenyloxyalkyl (alkenyl, preferably containing 2–6 carbon atoms, alkylene, preferably containing 1–4 carbon atoms). Suitable examples are ethylene oxide, propylene oxide, butylene oxide, butadiene monoxide, epichlorohydrin, epibromohydrin and allyl glycidyl ether.

The reaction of the tungsten halide compounds with the epoxides is preferably carried out at temperatures of between —10° C. and 60° C. The molar ratio of tungsten compound to epoxide is advantageously between 1:1 and 1:X, in which X is equal to the number of halogen atoms in the tungsten compound. The most efficient catalysts are generally obtained with 1–3 mols of epoxide per mol of tungsten halide compound.

The reaction may be carried out by adding the epoxide to a solution or suspension of the tungsten compound with stirring. The reaction is slightly exothermic. It is complete after 1 to about 120 minutes, depending on the quantity, concentration and temperature. Alternatively, the tungsten halide compound may be added to the epoxide e.g. in the form of a solution.

The catalyst starting material (a) may also be prepared by reacting the tungsten halide compounds with aliphatic halogenerated alcohols, preferably those having a halogen atom and an OH-group at adjacent carbon atoms, and this is also preferably carried out in solution in the above mentioned solvents.

The aliphatic halogenated alcohols are preferably compounds of the following formula:

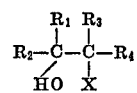

in which X represents fluorine, chlorine, iodine, or bromine, $R_1$, $R_2$, $R_3$ and $R_4$ may be the same or different and represent hydrogen or straight-chain or branched chain alkyl, cycloalkyl aryl or alkaryl or $R_1$ and $R_3$ together with the carbon atoms to which they are attached form a 5- or 6-membered or larger carbon ring. Alkyl is preferably an alkyl containing 1–4 carbon atoms, cycloalkyl contains preferably 5–12 carbon atoms, aryl is preferably phenyl or naphthyl, and alkaryl is preferably benzyl.

Most preferably X is chlorine or bromine, $R_1$ and $R_3$ are individually hydrogen, alkyl having 1 to 4 carbon atoms and together with the carbon atom to which they are attached form a 5 to 8 membered carbon ring, $R_2$ and $R_4$ are most preferably hydrogen, alkyl having 1 to 4 carbon atoms, cycloalkyl having 4 to 12 carbon atoms, phenyl, naphthyl and benzyl.

The following are examples of suitable haloalcohols: 2-chloroethanol; 2-bromoethanol; 2-iodoethanol; 1,3-dichloropropanol-2; 2-chlorocyclohexanol; 2 - chlorocyclopentanol.

The haloalcohols may be reacted in the same molar proportions and at the same temperatures with the tungsten halogen compounds as the epoxides. The proportions used are preferably in the order of 1–3 mols of halogenated alcohol per mol of tungsten and the temperature is preferably −10 to +60° C. As a rule, the halogenated alcohol is added with stirring to a solution of the tungsten halogen compound which may be supersaturated and may contain undissolved tungsten compound. The resulting hydrogen halide is removed from the reaction solution by passing a stream of nitrogen over the solution or by applying a vacuum or by heating.

The thus obtained solutions of "tungsten reaction products" may have any concentration, the concentration being limited upwardly by the solubility of the reaction products of tungsten compound with epoxides or halogenated alcohols. This solubility is generally considerably above the solubility of the tungsten halogen compounds, so that concentrated solutions can be made.

Suitable organoaluminum compounds correspond to the formula

wherein $R_5$ is hydrogen, alkyl having 1 to 12 carbon atoms and alkoxy having 1 to 12 carbon atoms, $R_6$ is hydrogen, alkyl having 1 to 12 carbon atoms, alkoxy having 1 to 12 carbon atoms and halogen such as fluorine, chlorine, bromine and iodine. $R_7$ is hydrogen, alkyl having 1 to 12 carbon atoms, alkoxy having 1 to 12 carbon atoms, halogen such as fluorine, chlorine, bromine, iodine, alkylamino and dialkylamino (alkyl $C_1$–$C_{12}$). Preferred alkyl and alkoxy radicals contain 1 to 6 carbon atoms. The preferred halogen is chlorine and iodine.

Most suitable are aluminum trialkyl, aluminum dialkylhalide, aluminum alkylhydride, dialkyl aluminum alkoxy, aluminum alkyldihalide, dialkoxy aluminum alkyl, dialkyl aluminum amino, dialkyl aluminum monoalkylamino and dialkyl aluminum dialkylamino where alkyl and alkoxy have from 1 to 6 carbon atoms and said halide is chloride, fluoride, bromide, or iodide.

Examples of such compounds are $Al(C_2H_5)_3$,
$Al(n-C_4H_9)_3$,
$Al(n-C_4H_9)_2H$,
$Al(n-C_6H_{13})_3$,
$Al(C_2H_5)_2Cl$,
$Al(n-C_4H_9)_2Cl$,
$Al(C_2H_5)Cl_2$,
$Al(C_2H_5)_2N—(CH_3)_2$,
$Al(C_{12}H_{25})_3$,
$Al(C_4H_9)_2J$,
$Al(C_3H_7)_2OC_2H_5$,
$Al(C_6H_{13})(OC_2H_5)_2$ Alkyl compounds of metals of Groups I-A, II-A and IV-A of the Mendeleev Periodic System are also suitable when they show comparable activity.

POLYMERIZATION

Copolymerization according to the invention may be carried out by adding the solution of the "tungsten reaction product" (as described above) and the organic aluminum compound, if desired in solution, in any sequence to a solution of the monomers at temperatures of between −50° C. and +60° C., preferably −20 to +20° C. If desired, the catalyst components may be reacted first and the monomers then added to the catalyst solution.

Preferably 0.1–4, more preferably 0.3–2 millimols of tungsten are used per 100 g. of monomer mixture. The molar ratio of tungsten/aluminum may preferably be from about 1:0.1 to about 1:10.

The solvents for the polymerization are preferably liquid aliphatic, cycloaliphatic or aromatic hydrocarbons or halogenated hydrocarbons (preferably having boiling points from about 50 to about 300° C.), e.g., pentane, hexane, cyclohexane, benzene, toluene, chlorobenzene and tetrachloroethylene.

The copolymerization is generally carried out at temperatures of from about −50 to about +60° C., preferably −20° C. to +20° C. Addition of the catalyst components is also generally carried out in this temperature range. Polymerization and preparation of the catalysts should be carried out with the exclusion of air and moisture, for example in an atmosphere of nitrogen or argon.

The molecular weights of the copolymers can be adjusted within certain limits by the choice of catalyst concentration, Al/W molar ratio and the quantity of alcohols or epoxides used.

When polymerization is complete or when the required degree of conversion has been reached, the catalyst can be deactivated by the addition of alcohols, carboxylic acids and/or amines. The usual stabilizers and age resistors may be added to the polymer solutions in quantities of 0.2–3%, based on the polymer, e.g. phenyl-$\beta$-naphthylamine, 2,6-di-tert.-butyl - 4 - methylphenol or 2,2'-dihydroxy-3,3'-di-tert.-butyl-5,5'-dimethyl - diphenylmethane. Tackifying agents, resins and oils may also be added after the polymerization.

The polymers may be isolated by precipitation with alcohols or in technical processes preferably by "stripping" the solvent from the solutions with steam. The crumbs of polymer obtained may then be dried by the usual methods, e.g. in a drying chamber, optionally under vacuum, or in a drying screw or on a conveyor belt drier.

The polymers are rubber-like elastomeric products and can be cross-linked by the known vulcanization methods and processed to yield rubber products.

The structural units which are derived from ring opening of the cyclic monolefin, e.g., cyclopentene contain C=C-bonds predominantly in the trans-configuration.

In contrast to the known catalyst systems for ring opening polymerization of cycloolefins the catalysts according to this invention are able to catalyse the copolymerization of cycloolefines, e.g. cyclopentene and cyclic or polycyclic polyolefines with no reduction of polymer yield. This applies particularly to the copolymerization of cyclopentene and polycyclic polyolefines such as norbornadiene, dicyclopentadiene and tricyclopentadiene. Whereas only low conversion can be obtained with the known systems containing co-catalysts even if only small quantities of these monomers are present, polymerization can be carried to high conversions with the catalysts according to the invention and polymers with predetermined degree of branching can be obtained. The degree of branching is a function of the quantity of cyclic polyolefins used for the copolymerization. The larger this quantity, the higher is the degree of branching. It can be estimated from the defo-values (DIN 53514). The degree of branching is very important in the processability of rubberlike polymers. In the case of oil extended polymers, it also determines to a large extent the cold flow of the material. The degree of branching can be adjusted by the quantity of polycyclic polyolefines, the branching increasing with increasing concentration of polyolefine.

Comparison Example 1 (using co-catalyst/catalyst systems)

Solutions of 600 ml. of toluene and 100 g. of cyclopentene having a water content of between 3–5 p.p.m.

were prepared in vessels equipped with stirrers under a nitrogen atmosphere with exclusion of moisture. For the copolymerization experiments, the dry comonomers were added to the cyclopentene solution.

Preparation of the catalysts was carried out with stirring as follows: $WCl_6$ in the form of a freshly prepared 3% solution in toluene was added to the monomer solutions at 0° C. The co-catalyst component, epichlorohydrin or tert.-butylhydroperoxide, was then stirred in and the solutions were cooled to —5° C. The aluminum alkyl compounds were now added in the form of 20% solutions in toluene. Polymerization started at once and the temperatures were maintained between —5° C. and 0° C. After 4 hours, the reactions were stopped by stirring into the reaction mixtures 0.5% of 2,2'-dihydroxy-3,3'-di-tert.-butyl-5,5' - dimethyl - diphenylmethane and 1.5% of ethanolamine, based on the monomer, dissolved in 20 ml. of ethanol and 60 ml. of benzene. The polymers were precipitated with ethanol and dried in vacuo at 50° C. The catalyst composition, quantity of comonomers, yields and properties of the polymers are summarized in Table 1.

dissolved in 22 ml. of toluene were added dropwise with stirring in the course of 60 minutes (temperature 25° C.). The hydrogen chloride liberated was removed by passing a slow stream of nitrogen over the reaction mixture with stirring and then continuing stirring for 1 hour. The quantity of HCl equivalent to the chloroethanol put into the reaction can be determined in the stream of nitrogen leaving the reaction mixture. The solution is 0.2 molar based on tungsten.

Polymerization experiments

The polymerization experiments were carried out in the same way as in Comparison Example 1 except that instead of $WCl_6$, the above reaction product was added to the monomer solutions at 0° C. The organic aluminum component was thereafter added at —5° C. The experimental results are summarized in Table 4. They show clearly the difference from the polymerization experiments in comparison Example 2 in which the co-catalyst system $WCl_6/ClCH_2CH_2OH/Al(C_2H_5)_3$ was used. The advantages of the WCl reaction products are clearly found here as in Example 1.

TABLE 1

| Experiment | a | b | c | d | e | f | g |
|---|---|---|---|---|---|---|---|
| mMol $WCl_6$ | 0.7 | 0.7 | 0.7 | 0.7 | 0.7 | 1.0 | 1.0 |
| mMol $CH_2\text{—}CH\text{—}CH_2Cl$ (epoxide) | 1.05 | 1.05 | 1.05 | 1.05 | 1.05 | | |
| mMol tert.-butyl-hydroperoxides | | | | | | 0.8 | 0.8 |
| mMol $Al(C_2H_5)_3$ | 1.05 | 1.05 | 1.05 | 1.05 | 1.05 | | |
| mMol $Al(C_4H_9)_3$ | | | | | | 1.8 | 1.8 |
| Amount of butene-1 contained in cyclopentene (percent) | | | | | | 0.08 | 0.08 |
| Comonomer (percent based on cyclopentene): | | | | | | | |
| Norbornadiene | 0.5 | 1.0 | | | | | 3.0 |
| Cycloocta-1,5-diene | | | 2.0 | | | | |
| Cyclododeca-1,5,9-triene | | | | 2.0 | | | |
| Conversion percent | 35 | 40 | 37 | 41 | 70 | 72 | 35 |
| ($\eta$) value | 3.29 | 3.72 | 2.4 | 2.7 | 2.73 | 1.70 | |
| Defo plasticity DIN 53514 | 2,400 | 4,200 | 550 | 590 | 650 | 300 | 5,400 |
| Defo elasticity DIN 53514 | 28 | 43 | 12 | 11 | 5 | 19 | 52 |
| Trans-1,5 linkage, percent* | 89.3 | 87.1 | 90.1 | | 91.7 | 91.3 | 89.3 |

*Determined by IR-spectroscopy according to G. Natta et al., Angew. Chem. 76, 765 (1964).

Comparison Example 2

Polymerization experiments were carried out under the same conditions as in the above comparison example, using $ClCH_2CH_2OH$ as co-catalyst. The results are summarized in Table 2.

EXAMPLE 1

Reaction of $WCl_6$ with epichlorohydrin 11.8 g. of fine-grained tungsten hexachloride in 100 ml. of anhydrous toluene were introduced into a reaction vessel under nitrogen with exclusion of moisture. 5.6 g. of epichlorohydrin dissolved in 20 ml. of toluene were added dropwise with stirring in the course of 10 minutes. The color of the solution changed from blue to deep brown and the sediment of $WCl_6$ at the bottom dissolved completely. The temperature during the reaction was 35° C. to 40° C. After the reaction, stirring was continued for 45 minutes (concentration of the solution 0.238 mmol of tungsten per ml.).

Polymerization experiments

Copolymerization experiments were carried out under the same conditions as in comparison Example 1. The tungsten was added to the monomer solution in the form of its reaction product with epichlorohydrin at 0° C., and the aluminum alkyl component was then added at —5° C. The conditions were otherwise the same. The experimental results are summarized in Table 3.

EXAMPLE 2

Reaction of $WCl_6$ with $ClCH_2CH_2OH$ 9.9 g. of $WCl_6$ in 100 ml. of anhydrous toluene were introduced into a flask equipped with stirrer with exclusion of oxygen and moisture. 4 g. of 2-chloroethanol

TABLE 2

| Experiment | a | b | c | d |
|---|---|---|---|---|
| mMol $WCl_6$ | 0.8 | 0.8 | 0.8 | 0.8 |
| mMol $ClCH_2CH_2OH$ | 0.96 | 0.96 | 0.96 | 0.96 |
| mMol $Al(C_2H_5)_3$ | 1.85 | 1.85 | 1.85 | 1.85 |
| Butene-1 in cyclopentene (percent)* | 0.005 | 0.005 | 0.007 | 0.015 |
| Comonomer: (percent based on cyclopentene): | | | | |
| Norbornadiene | | 0.5 | 1.0 | |
| Dicyclopentadiene | | | | 1.5 |
| Yield | 75 | 48 | 43 | 60 |
| ($\eta$) value | 2.28 | 3.96 | 5.0 | 3.1 |
| Defo plasticity | 1,000 | 4,100 | 5,500 | 2,300 |
| Defo elasticity | 33 | 43 | 42 | 30 |
| IR spectrum, trans-1,4 linkage percent | 91.3 | 89.3 | 87.7 | 98.2 |

*Butene-1 was used to regulate the molecular weight. The molecular weight decreases with increasing concentration of butene-1 or other olefines.

TABLE 3

| Experiment | a | b | c | d | e |
|---|---|---|---|---|---|
| mMol tungsten (reaction product with epichlorohydrin) | 0.4 | 0.4 | 0.4 | 0.4 | 0.4 |
| mMol $Al(C_2H_5)_2Cl$ | 1.0 | 1.0 | 1.0 | 1.0 | 1.0 |
| Percent butene-1 in cyclopentene | 0.003 | 0.005 | 0.01 | 0.0075 | 0.002 |
| Comonomers, percent in cyclopentene: | | | | | |
| Norbornadiene | 0.4 | 0.5 | 1.0 | | |
| Tricyclopentadiene | | | | 1.0 | |
| Conversion, percent | 70 | 73 | 72 | 69 | 70 |
| Intrinsic viscosity ($\eta$) | 2.6 | 2.4 | 2.79 | 2.54 | 2.2 |
| Mooney ML 4', 100° C | 110 | 85 | 103 | 79 | 60 |
| Defo/elastic proportion | 775/13 | 725/24 | 1,100/29 | 500/12 | 400/4 |
| IR spectrum, percent trans-1,4 linkage | 92.0 | 91.6 | 91.8 | 91.5 | 91.8 |

TABLE 4

| Experiment | a | b | c | d |
|---|---|---|---|---|
| mMol tungsten (reaction product with chloroethanol) | 0.4 | 0.4 | 0.4 | 0.4 |
| mMol Al(C$_2$H$_5$)$_2$Cl | 1.8 | 1.8 | 1.8 | 1.8 |
| Percent butene-1 in cyclopentene | 0.01 | 0.01 | 0.02 | 0.025 |
| Comonomer, percent in cyclopentene: | | | | |
|   Norbornadiene | | 0.6 | 1.0 | |
|   Dicyclopentadiene | | | | 1.5 |
| Conversion percent | 80 | 80 | 78 | 82 |
| Intrinsic viscosity ($\eta$) | 2.23 | 2.5 | 2.61 | 1.41 |
| Mooney viscosity | 66 | 79 | 97 | 82 |
| Defo/elastic proportion | 525/12 | 825/20 | 1,125/24 | 825/24 |
| IR spectrum, trans-1,4 linkage | 91.0 | 91.1 | 91.0 | 90.8 |

We claim:

1. A process for producing copolymers which comprises contacting a cyclic monoolefin having 4 to 18 carbon atoms with 0.01–50% by weight, based on the weight of the cyclic monoolefin, of a monocyclic polyolefin having from 5 to 18 carbon atoms or a polycyclic polyolefin having from 7 to 18 carbon atoms at a temperature of between —50 and +60° C. in an inert organic solvent with a catalytic amount of a catalyst which is a mixture of (a) the reaction product of 1 mol of tungsten halide or tungsten oxyhalide with from 1 to 3 mols of an epoxide of the formula

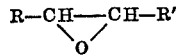

or with from 1 to 3 mols of an alcohol of the formula

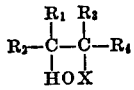

wherein R and R' are hydrogen, alkyl having 1 to 6 carbon atoms, alkoxy having 1 to 6 carbon atoms, alkenyl having 2 to 6 carbon atoms, chloroalkyl or bromoalkyl having 1 to 6 carbon atoms or alkenyloxyalkyl having 2 to 6 carbon atoms in the alkenyl moiety and 1 to 4 carbon atoms in the alkyl moiety, $R_1$, $R_2$, $R_3$ and $R_4$ are hydrogen, alkyl having 1 to 4 carbon atoms, cycloalkyl having 5 to 12 carbon atoms, phenyl, naphthyl or benzyl or $R_2$ and $R_4$ are as aforesaid and $R_1$ and $R_3$ together with the carbon atoms to which they are attached form a cyclic carbon structure having from 5 to 8 carbon atoms and X is halogen and (b) an oragnoaluminum compound, the molar ratio of tungsten to aluminum being about 1:0.1 to about 1:10.

2. The process of claim 1 wherein said cyclic monoolefin is cyclopentene.

3. The process of claim 1 wherein the monocyclic polyolefin is cyclopentadiene, cycloocta-1,4-diene or cyclododeca-1,5,9-triene.

4. The process of claim 1 wherein the polycyclic polyolefin is norbornadiene, dicyclopentadiene and tricyclopentadiene.

5. The process of claim 1 wherein said inert organic solvent is a hydrocarbon or halohydrocarbon having a boiling point of from 50 to 300° C.

6. The process of claim 1 wherein said reaction product (a) is prepared by reacting 1 mol of the tungsten compound with from 1 to 3 mols of the epoxide in an inert organic solvent at a temperature of from —10 to +60° C.

7. The process of claim 6 wherein said inert organic solvent is a hydrocarbon or halogenated hydrocarbon having a boiling point of from 50 to 300° C.

References Cited
UNITED STATES PATENTS

| | | | |
|---|---|---|---|
| 3,449,310 | 6/1959 | Dall'Asta | 260—93.1 |
| 3,476,728 | 11/1969 | Natta | 260—93.1 |
| 3,502,626 | 3/1970 | Dall'Asta | 260—80.78 |
| 3,577,400 | 5/1971 | Judy | 260—88.2 |
| 3,597,403 | 8/1971 | Ofstead | 260—88.2 |
| 3,597,406 | 8/1971 | Calderon | 260—93.1 |

JOSEPH L. SCHOFER, Primary Examiner

R. S. BENJAMIN, Assistant Examiner

U.S. Cl. X.R.

252—429 B; 260—80.78